J. A. SHARP.
GRAIN HARVESTER.
APPLICATION FILED FEB. 24, 1910.

1,002,209.

Patented Aug. 29, 1911.

2 SHEETS—SHEET 1.

Witnesses:
F. W. Hoffmeister
H. J. Jasmer

Inventor
James A. Sharp
By E. W. Burgess
Attorney

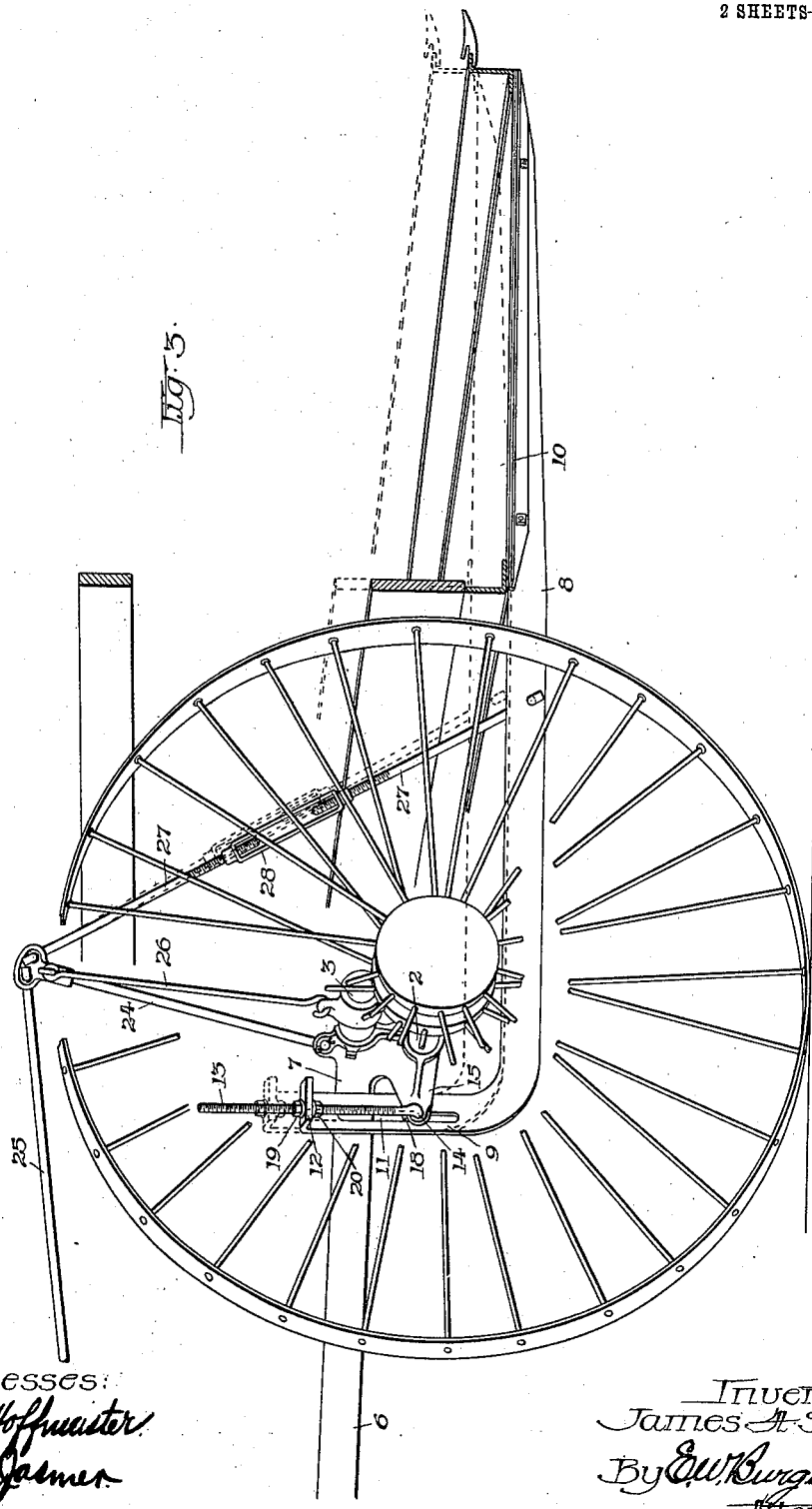

UNITED STATES PATENT OFFICE.

JAMES A. SHARP, OF SPRINGFIELD, OHIO, ASSIGNOR TO INTERNATIONAL HARVESTER COMPANY, A CORPORATION OF NEW JERSEY.

GRAIN-HARVESTER.

1,002,209.  Specification of Letters Patent.  Patented Aug. 29, 1911.

Application filed February 24, 1910. Serial No. 545,572.

*To all whom it may concern:*

Be it known that I, JAMES A. SHARP, a citizen of the United States, residing at Springfield, in the county of Clark and State of Ohio, have invented certain new and useful Improvements in Grain-Harvesters, of which the following is a specification.

My invention relates to that type of grain harvesters commonly called headers, in which the grain platform and cutting apparatus are located in front of the draft animals, that are connected with what is usually called a push pole connection forming part of a harvester; the object of my invention being to provide an improved mechanism whereby the height and angle of the grain platform may be adjusted relative to the wheel frame of the harvester. This object is attained by means of the mechanism illustrated in the accompanying drawing, in which—

Figure 1:
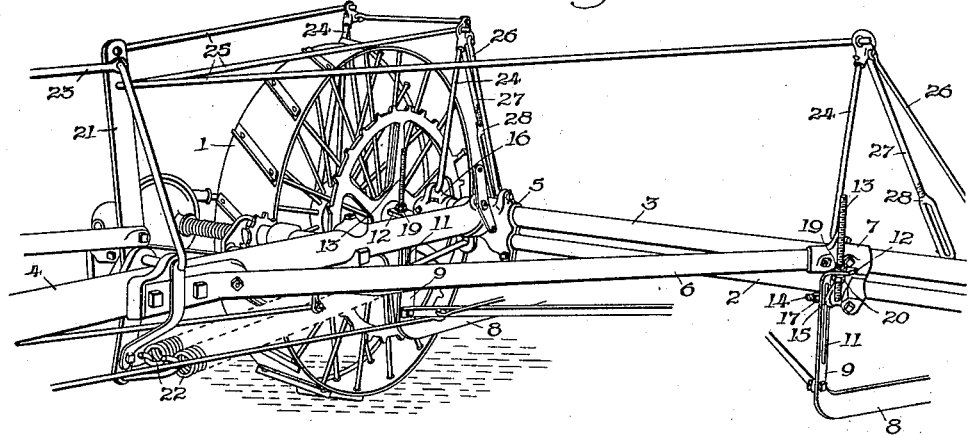
Figure 2:
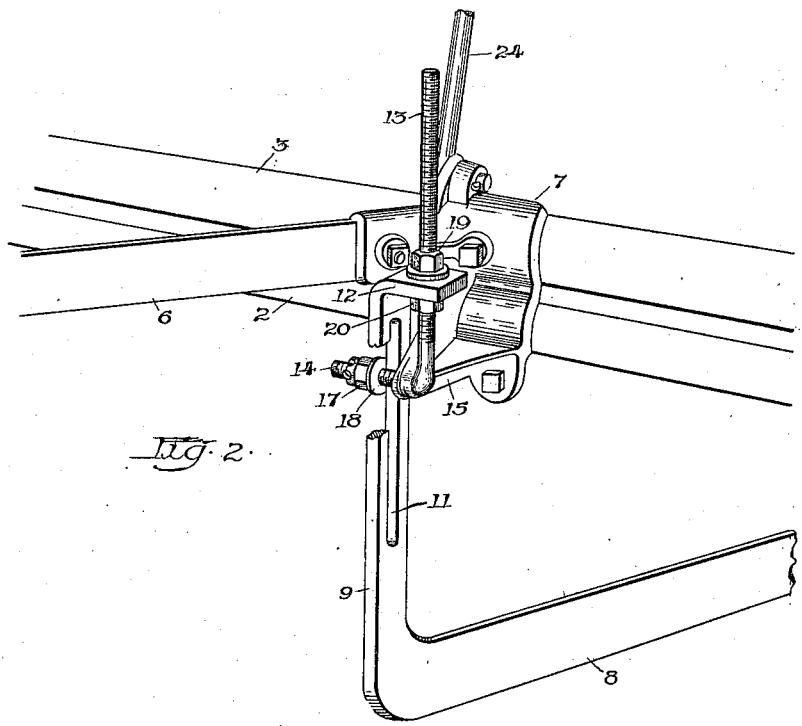

Figure 1 is a view in perspective of part of a header sufficient to illustrate the application of my invention; Fig. 2 is a view in perspective on an enlarged scale of a detailed part of the platform adjusting mechanism, as shown in Fig. 1; and Fig. 3 is a perspective end elevation of the grain platform designed to illustrate the operation of the platform adjusting devices.

The same reference characters designate like parts throughout the several views.

1 represents a main traction wheel, 2 an axle, 3 a wheel frame member above the axle and arranged parallel therewith, 4 a push pole member extending rearward from the axle and having its forward end and frame member 3 connected therewith by means of a joining member 5, and 6 represents a brace member having its rear end secured to the side of the push pole and its forward end connected with the axle and frame member 3 toward the grainward end thereof by means of the joining member 7.

8 represents forwardly extending platform supporting bars suspended below the axle, having their rear ends 9 turned upward in rear thereof. 10 represents the grain platform mounted upon the forward ends of said bars. The rear ends of the bars are provided with vertically arranged slots 11 that have their upper ends turned outward in the direction of the length of the axle, forming ear portions 12 that are provided with vertical openings adapted to receive threaded rods 13 that have their lower ends 14 turned inward parallel with the ear portions 12. The rods 13 are connected with the fixed frame members by having their inturned lower ends 14 received by transverse openings in the rearwardly projecting ears 15 on member 7 at the grainward side of the machine, and a similar member 16 at the stubbleward side thereof, and extending through slots 11 are provided with securing nuts 17 and washers 18 whereby the rear ends of the bars 8 may be clamped closely to the sides of the ear portions 15. The upper threaded ends of rods 13 are provided with nuts 19 and 20 at the upper and lower sides, respectively, of ear portions 12, whereby the bars 8 may be adjusted at their rear ends in a vertical plane relative to the wheel frame and are securely held in adjusted relation therewith. A lever 21 is pivotally mounted upon the push pole in a manner to vibrate in a vertical plane, and 22 represents counterbalancing springs connecting its lower end with a fixed part of the wheel frame, and 23 is a rod whereby the operator may manipulate the lever.

24 represents swinging struts having their lower ends pivotally connected with the wheel frame and their upper ends to the upper end of lever 21 by means of rods 25, the struts being sustained laterally by means of brace members 26 and having their lower ends pivotally connected with the wheel frame coaxially with the struts.

27 represents two-part links connecting the upper ends of the struts with the bars 8 forward of the axle, the two parts of the links being threaded at their inner ends and connected by means of turn buckles 28 whereby their effective length may be adjusted as desired.

In operation the grain platform may be tilted about the pivotal connection between the lower ends 14 of the rods 13 and ears 15 by means of lever 21. The rear side of the platform may be raised or lowered by means of the rods 13, and its front side adjusted independent of lever 21 by means of turn buckles 28.

What I claim as being my invention, and desire to secure by Letters Patent, is:

1. A platform adjusting mechanism for harvesters including, in combination, a wheel frame, an axle mounted thereon, a push pole connected with said wheel frame, a grain platform, bars arranged below said axle in the direction of travel of the machine, having said platform mounted upon their forward ends and their rear ends turned upward in rear of said axle and terminating in laterally projecting ear portions, the upturned ends being provided with vertically arranged slots, threaded rods having their lower ends turned laterally and pivotally connected with a fixed part of said wheel frame, said laterally turned ends being received by said slots, having nuts thereon whereby said bars may be secured against the fixed parts of the wheel frame, and the upper ends of said rods engaging with said ear portions and having adjusting nuts thereon whereby the rear ends of said bars may be adjusted to various levels relative to said wheel frame.

2. A platform adjusting mechanism for harvesters including, in combination, a wheel frame, an axle mounted thereon, a push pole connected with said wheel frame, a grain platform, bars arranged below said axle in the direction of travel of the machine, having said platform mounted upon their forward ends and their rear ends turned upward in rear of said axle and terminating in laterally projecting ear portions, said upturned ends being provided with vertically arranged slots, threaded rods having their lower ends turned laterally and pivotally connected with fixed parts of the wheel frame, said laterally turned ends being received by said slots having nuts thereon whereby said bars may be secured against said fixed parts of said wheel frame, and the upper ends of said rods engaging with said ear portions, having adjusting nuts thereon whereby the rear ends of said bars may be adjusted to various heights relative to said wheel frame, a tilting lever mounted upon said push pole, connections between said lever and said bars in front of said axle whereby the forward side of said platform may be raised or lowered, and turn buckles forming part of said connections, whereby the relative positions of said lever and platform may be adjusted.

JAMES A. SHARP.

Witnesses:
GEO. W. RUSSELL,
W. B. KENDIG.

Copies of this patent may be obtained for five cents each, by addressing the "Commissioner of Patents, Washington, D. C."